United States Patent
Asako et al.

(10) Patent No.: US 11,848,151 B2
(45) Date of Patent: *Dec. 19, 2023

(54) METHOD FOR MANUFACTURING MAGNETIC BODY AND COIL COMPONENT CONTAINING MAGNETIC BODY

(71) Applicant: TAIYO YUDEN CO., LTD., Tokyo (JP)

(72) Inventors: Norihiro Asako, Takasaki (JP); Kenji Yazawa, Takasaki (JP); Makoto Aoki, Takasaki (JP); Tomomi Kobayashi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/950,759

(22) Filed: Sep. 22, 2022

(65) Prior Publication Data

US 2023/0035861 A1 Feb. 2, 2023

Related U.S. Application Data

(63) Continuation of application No. 17/121,526, filed on Dec. 14, 2020, now Pat. No. 11,488,773.

(30) Foreign Application Priority Data

Dec. 26, 2019 (JP) .................................. 2019-236911
Dec. 26, 2019 (JP) .................................. 2019-236912

(51) Int. Cl.
| | |
|---|---|
| *H01F 41/02* | (2006.01) |
| *H01F 1/34* | (2006.01) |
| *C04B 35/26* | (2006.01) |
| *H01F 41/04* | (2006.01) |
| *H01F 27/28* | (2006.01) |

(52) U.S. Cl.
CPC ....... *H01F 41/0246* (2013.01); *C04B 35/265* (2013.01); *H01F 1/344* (2013.01); *H01F 27/28* (2013.01); *H01F 41/04* (2013.01); *C04B 2235/327* (2013.01); *C04B 2235/3279* (2013.01); *C04B 2235/3281* (2013.01); *C04B 2235/3284* (2013.01)

(58) Field of Classification Search
CPC .......... H01F 27/28; H01F 1/344; H01F 41/04; H01F 41/0246; C04B 35/265; C04B 2235/327; C04B 2235/3279; C04B 2235/3284; C04B 2235/3281

See application file for complete search history.

(56) References Cited

U.S. PATENT DOCUMENTS 11,488,773 B2 * 11/2022 Asako ................ C01G 49/0063

FOREIGN PATENT DOCUMENTS

| JP | 2002289421 A | 10/2002 |
|---|---|---|
| JP | 2003212547 A | 7/2003 |
| JP | 2006282437 A | 10/2006 |
| JP | WO2013115064 A1 | 5/2015 |
| JP | 2017197417 A | 11/2017 |
| WO | 2013115064 A1 | 8/2013 |

OTHER PUBLICATIONS

Notice of Allowance issued by U.S. Patent and Trademark Office, dated Jun. 30, 2022, for related U.S. Appl. No. 17/121, 526 (12 pages).
A Notice of Reasons for Refusal issued by the Japanese Patent Office, dated Apr. 25, 2023, for Japanese related application No. 2019-236911. (5 pages).
A Notice of Reasons for Refusal issued by the Japanese Patent Office, dated May 18, 2023, for Japanese counterpart application No. 2019-236912. (4 pages).
A Notice of Reasons for Refusal issued by the Japanese Patent Office, dated Sep. 12, 2023, for Japanese counterpart application No. 2019-236912. (4 pages).
A Notice of Reasons for Refusal issued by the Japanese Patent Office, dated Sep. 12, 2023, for Japanese counterpart application No. 2019-236911. (5 pages).

* cited by examiner

*Primary Examiner* — C Melissa Koslow
(74) *Attorney, Agent, or Firm* — Law Office of Katsuhiro Arai (57) ABSTRACT

When manufacturing a magnetic body which is made of a ferrite material containing Fe, Ni, and Zn, and whose Mn content is 0.1288 percent by mass or higher, or a magnetic body which is made of a ferrite material containing Fe, Ni, Zn, and Cu, and whose Mn content is 0.1178 percent by mass or higher, an iron oxide powder whose Mn content is 0.20 percent by mass or higher is used as a raw material powder.

8 Claims, 3 Drawing Sheets

METHOD FOR MANUFACTURING MAGNETIC BODY AND COIL COMPONENT CONTAINING MAGNETIC BODY

CROSS-REFERENCE TO RELATED APPLICATIONS

The present application is a continuation of U.S. patent application Ser. No. 17/121,526, filed Dec. 14, 2020, now U.S. Pat. No. 11,488,773, which claims priority to Japanese Patent Application Nos. 2019-236911 and 2019-236912, filed Dec. 26, 2019, the disclosure of which is incorporated herein by reference in its entirety including any and all particular combinations of the features disclosed therein.

BACKGROUND

Field of the Invention

The present invention relates to a method for manufacturing a magnetic body, and a coil component containing a magnetic body.

Description of the Related Art

An inductor or other coil component comprising a combination of a magnetic body and a winding wire is sometimes used in a power-supply circuit device for the purpose of voltage conversion. In this case, approx. 1 to 10 A of direct current flows through the coil component. Accordingly, the coil component must be able to keep any current-induced changes to its inductance property small, or specifically, offer excellent direct-current superimposition property. Means for obtaining a coil component having excellent direct-current superimposition property include using a magnetic body having high saturated magnetic flux density and, to obtain such magnetic body, studies are underway with focus on its raw materials.

Among the magnetic materials used for coil components, Mn—Zn ferrite has high saturated magnetic flux density and low loss, and thus allows a coil component having excellent direct-current superimposition property to be formed. When used in a coil component, however, Mn—Zn ferrite requires a wire to be wound via an insulator because it has low electrical resistivity and does not provide sufficient electrical resistance against the voltage used. This increases the volume of the coil component by the insulator, thus making it difficult to obtain a coil component of small size.

On the other hand, Ni—Zn ferrite has excellent insulating property, and thus allows a wire to be wound directly around a magnetic body made thereof, which serves as an advantage for this material in terms of reducing the coil component size. However, Ni—Zn ferrite tends to have lower saturated magnetic flux density and poorer direct-current superimposition property than Mn—Zn ferrite, and accordingly various studies have been conducted to improve these drawbacks.

For example, Patent Literature 1 presents a specific Ni—Zn ferrite composition containing manganese oxide ($Mn_2O_3$). In Patent Literature 1, it is described that "By replacing the $Fe_2O_3$ site of NiCuZn ferrite with $Mn_2O_3$, an oxide magnetic material having high saturated magnetic flux density, low loss, and significantly high specific resistance, can be obtained" (paragraph [0048]).

Also, in Patent Literature 2, Ni—Zn ferrite is obtained by adding calcium silicate ($CaSiO_3$) and antimony oxide ($Sb_2O_3$) as secondary components, to a calcined primary component powder whose composition has been adjusted to a specific range by adding manganese oxide (MnO), in order to improve the direct-current superimposition property over the level achieved in Patent Literature 1. In Patent Literature 2, it is described that "Such Ni—Zn ferrite material offers high saturated magnetic flux density and good direct-current superimposition property because manganese Mn has been added to it" (paragraph [0050]).

Background Art Literatures

| | |
|---|---|
| [Patent Literature 1] | Japanese Patent Laid-open No. 2002-289421 |
| [Patent Literature 2] | Japanese Patent Laid-open No. 2017-197417 |

SUMMARY

Still, as described or suggested in Patent Literatures 1 and 2 (paragraph [0050] in both), the fact that Ni—Zn ferrite contains Mn presents concerns that the magnetic permeability may drop.

Patent Literature 2 confirms that adding the secondary components increases the specific magnetic permeability and saturated magnetic flux density of the magnetic body, while reducing the core loss. This means that the method described in Patent Literature 2 improves the direct-current superimposition property of the coil component, while at the same time inhibiting the magnetic permeability from dropping due to Mn. However, this method presents problems including the need for strict management of the deleterious substance $Sb_2O_3$ used as an additive, and the difficulty dispersing the secondary components evenly because their quantities are very small compared to the primary components.

The present invention was made in light of the aforementioned problems, and its object is to obtain a coil component having excellent direct-current superimposition property and magnetic permeability property, wherein its magnetic body, made of a Ni—Zn ferrite material, does not contain any additives as essential components other than the primary components of the Ni—Zn ferrite material.

The inventor of the present invention found, during the course of studying to achieve the aforementioned object, that, depending on the types of raw materials used, the obtained magnetic bodies and coil components in which such magnetic bodies are used would have varying properties even when the raw materials are compounded in a manner obtaining a Ni—Zn ferrite material of the same composition. Specifically, the inventor found that, when producing a magnetic body made of a Ni—Zn ferrite material, the impact of poor dispersion would not be fully eliminated and the properties of the coil component would always be affected adversely, under the conventional method of adding Mn separately to the primary raw materials as an additive in very small quantity. And, the inventor found that the aforementioned object could be achieved by adopting an iron oxide powder containing a specific quantity of Mn as a raw material used in the manufacturing of the magnetic body, instead of using manganese oxide or other additives, and also by compounding the raw material powders in such a way that the mol ratio of Ni and Zn (Ni/Zn) would become favorable with respect to the Mn content in the iron oxide powder, and consequently completed the present invention.

In other words, an aspect of the present invention for achieving the aforementioned object is a method for manufacturing a magnetic body made of a ferrite material containing Fe, Ni, and Zn, wherein such method for manufacturing a magnetic body is characterized in that an iron oxide powder whose Mn content is 0.20 to 0.85 percent by mass is used as a raw material powder.

Additionally, another aspect of the present invention for achieving the aforementioned object is a method for manufacturing a magnetic body made of a ferrite material containing Fe, Ni, and Zn, wherein such method for manufacturing a magnetic body is characterized in that, in addition to using an iron oxide powder whose Mn content is 0.20 percent by mass or higher as a raw material powder, a mol ratio of Ni to Zn (Ni/Zn) in the ferrite material is determined based on the Mn content in the iron oxide powder, and the raw material powders are compounded in such a way that the mol ratio is achieved.

According to the present invention, a coil component having excellent direct-current superimposition property and magnetic permeability property can be provided, wherein its magnetic body, made of a ferrite material containing Fe, Ni, and Zn, does not contain any additives other than the primary components of the ferrite material.

DETAILED DESCRIPTION OF EMBODIMENTS

The constitutions as well as operations and effects of the present invention are explained below, together with the technical ideas, by referring to the drawings. It should be noted, however, that the mechanisms of operations include estimations and whether they are correct or wrong does not limit the present invention in any way. Also, of the components in the aspects below, those components described in an aspect but not in another aspect are alternative, additional, or optional components and can be positively excluded from the another aspect or can be replaced with any components equivalent thereto including those explicitly, necessarily, or inherently disclosed herein. It should be noted that a description of numerical range (description of two values connected by "to") is interpreted to include the described values as the lower limit and the upper limit in some embodiments, and in other embodiments, the range is exclusive of the lower limit and/or the upper limit.

In an aspect of the present invention, a ferrite material containing Fe, Ni, and Zn that constitutes a magnetic body is also called "Ni—Zn ferrite material." This ferrite material has a composition in which Fe, Ni, and Zn are contained as primary components and in many cases Cu is contained as a component, and in which very small quantities of additives and impurities can also be contained in some instances. The method for manufacturing a magnetic body made of the ferrite material pertaining to an aspect of the present invention (hereinafter also referred to simply as "first aspect") includes: preparing raw material powders; mixing the raw material powders into a mixed powder; heat-treating the mixed powder to become a calcined powder whose primary components are Fe, Ni, and Zn; compacting the calcined powder into a compact; and sintering the compact to become a magnetic body. The first aspect is characterized in that, as a raw material powder, an iron oxide powder whose Mn content is 0.20 to 0.85 percent by mass is used.

The iron oxide powder used as a raw material in the first aspect contains Mn by 0.20 to 0.85 percent by mass in terms of element (i.e., the content of Mn is 0.20 to 0.85 percent by mass). By setting the content of Mn in iron oxide to 0.20 percent by mass or higher, a coil component constituted by the obtained magnetic body can have excellent direct-current superimposition property. From the viewpoint of obtaining a coil component having superior direct-current superimposition property, preferably the Mn content in the iron oxide powder is set to 0.30 percent by mass or higher. On the other hand, a magnetic body having excellent magnetic permeability can be obtained by setting the Mn content in the iron oxide powder to 0.85 percent by mass or lower. From the viewpoint of obtaining a magnetic body having superior magnetic permeability, preferably the Mn content is set to 0.80 percent by mass or lower. Also, by setting the content of Mn in the iron oxide powder to 0.80 percent by mass or lower, a coil component having superior direct-current superimposition property can be obtained.

In the first aspect, the Mn content in the iron oxide powder refers to a value obtained by analyzing the procured iron oxide powder according to the ICP emission spectroscopy method. Or, if the procured iron oxide powder is accompanied by an analysis sheet based on the ICP emission spectroscopy method or other analysis method of equivalent or greater accuracy, the value of Mn content indicated in the analysis sheet may be adopted directly.

The raw material powders used in the first aspect, other than the iron oxide powder, are not limited in any way so long as they respectively contain nickel (Ni) and zinc (Zn), which are essential components of a magnetic body, and various compounds including simple metals, alloys, and oxides may be used. Such compounds may be complex oxides, etc., containing multiple metal elements. Among these, preferably the oxides NiO and ZnO are used because they are subject to less grain-shape and grain-size variabilities and are readily available as powders constituted by small-size grains.

The compounding ratios of the aforementioned raw material powders are not limited in any way so long as a Ni—Zn ferrite material can be obtained. In one example, the respective raw material powders are compounded in such a way that the contents of Fe, Zn, and Ni in the Ni—Zn ferrite material, in terms of $Fe_2O_3$, ZnO, and NiO, become 47.3 to 49.8 percent by mol of $Fe_2O_3$, 15.0 to 36.9 percent by mol of ZnO, and 15.0 to 36.9 percent by mol of NiO. In an example of compounding of the raw material powders expressed in percent by mass, they are compounded in such a way that the contents of the respective components in the Ni—Zn ferrite material, in terms of $Fe_2O_3$, ZnO, and NiO, become 64.4 to 67.4 percent by mass of $Fe_2O_3$, 10.4 to 25.6 percent by mass of ZnO, and 9.4 to 23.8 percent by mass of NiO. The compounding ratios of the raw material powders are determined in such a way that, after considering the decrease in each component due to volatilization, etc., during the manufacturing process, a Ni—Zn ferrite material of the desired composition can be obtained. If there is virtually no decrease in the components during the manufacturing process, the compounding ratios should be the same as the composition of the desired Ni—Zn ferrite material to be obtained. It should be noted that, in general, there is little difference between the compounding composition and the composition of the obtained Ni—Zn ferrite material.

In the first aspect, preferably copper (Cu) is contained in one of the raw material powders. When the Ni—Zn ferrite material contains Cu, its sintering property during sintering improves, and a magnetic body offering excellent magnetic property and mechanical strength can be obtained. From the viewpoint of allowing the aforementioned sintering property improvement action to manifest to the fullest extent possible, the content of Cu in the raw material powders is adjusted preferably to 1 percent by mol or higher, or more preferably to 3 percent by mol or higher, in terms of CuO in the Ni—Zn ferrite material. From the viewpoint of inhibiting the compact or sintered body from deforming during sintering, on the other hand, the content of Cu in the raw material powders is adjusted preferably to 13 percent by mol or lower, or more preferably to 11 percent by mol or lower, in terms of CuO in the Ni—Zn ferrite material. In an example of compounding of the raw material powders when the Ni—Zn ferrite material contains Cu, the respective raw material powders are compounded in such a way that the contents of Fe, Zn, Ni, and Cu in the Ni—Zn ferrite material, in terms of $Fe_2O_3$, ZnO, NiO, and CuO, become 41.6 to 49.3 percent by mol of $Fe_2O_3$, 13.3 to 36.5 percent by mol of ZnO, 13.3 to 36.5 percent by mol of NiO, and 1.0 to 12.1 percent by mol of CuO. In an example of compounding of the raw material powders expressed in percent by mass, they are compounded in such a way that the contents of the respective components in the Ni—Zn ferrite material, in terms of $Fe_2O_3$, ZnO, NiO, and CuO, become 58.9 to 66.9 percent by mass of $Fe_2O_3$, 9.5 to 25.4 percent by mass of ZnO, 8.6 to 23.6 percent by mass of NiO, and 0.6 to 8.6 percent by mass of CuO. The aforementioned Cu content (in terms of CuO) is set more preferably to 2 percent by mass or higher, and more preferably to 8 percent by mass or lower.

The raw material powder containing Cu is not limited in any way, and metal copper, copper alloy, or any of various compounds such as oxides may be used. Such compounds may be complex oxides, etc., containing metal elements other than Cu. Among these, preferably the oxide CuO is used because it is subject to less grain-shape and grain-size variabilities and is readily available as powders constituted by small-size grains.

In the first aspect, unavoidable impurities are permitted to be contained in the raw material powders or magnetic body by up to several hundreds of ppm or so.

Examples of unavoidable impurities include B, C, S, Cl, Se, Br, Te, I, Li, Na, Mg, Al, K, Ga, Ge, Sr, In, Sn, Sb, Ba, Pb, Bi, and other typical elements, as well as Sc, Ti, V, Cr, Y, Nb, Mo, Pd, Ag, Cd, Hf, Ta, and other transition elements.

While the first aspect can provide a coil component having excellent direct-current superimposition property without using any additives other than the aforementioned primary components, a magnetic body may be manufactured by adding various secondary components to the Ni—Zn ferrite material to obtain a coil component offering even higher performance.

In the first aspect, the method for mixing the raw material powders is not limited in any way so long as the powders can be mixed evenly in a manner preventing impurities from mixing in, and either dry mixing or wet mixing may be adopted. If wet mixing using a ball mill is adopted, around 8 to 24 hours of mixing is sufficient, for example.

The conditions for heat-treating the mixed powder are not limited so long as a calcined powder of Ni—Zn ferrite (Ni—Zn ferrite material) having the desired composition can be obtained as a result of the raw materials reacting with each other, and may be set as 1 to 3 hours at 800 to 1000° C. in atmosphere, for example. If the sintering temperature is too low or the sintering period is too short, unreacted raw materials or intermediate products may remain. If the sintering temperature is too high or the sintering period is too long, on the other hand, a compound of the desired composition may not be obtained due to volatilization of the components, or the productivity may drop as the resulting products solidify in a hard-to-pulverize.

In the first aspect, preferably any agglutination, if present, in the calcined powder obtained by the aforementioned heat treatment is pulverized prior to compaction. Disintegration is performed to break up the agglutination of calcined powder so that the powder will have appropriate sintering property. Pulverization may be performed dry using a vibration mill, hammer mill, roller mill, etc., or if large clumps have formed in the calcined powder, preferably the powder is coarsely ground first and then pulverized wet using a ball mill, attritor, etc. From the viewpoints of compactability, shape retainability and sintering property, preferably pulverization is performed until the average grain size of the calcined powder becomes approx. 0.5 to 2 μm.

In the first aspect, compaction of the calcined powder may be preceded by granulation of this calcined powder to obtain granulated substances (granules). Granulation is performed to convert the ground material into appropriately-sized aggregate grains having a form suitable for compaction. Methods for performing this granulation include the pressure granulation method, spray dry method, etc., for example.

In the first aspect, the calcined powder thus obtained is compacted into a prescribed shape to obtain a compact. The compacting method is not limited in any way and examples include uniaxial press-forming of the powder, extrusion of a green body containing the powder, casting of a slurry in which the powder has been dispersed, and the like. The shape of the compact is not limited in any way, either, and any of known shapes such as bar, sheet, toroid, drum, etc., may be selected as deemed appropriate according to the purpose of use.

In the first aspect, the compact thus obtained is sintered to become a magnetic body. As a result, the powder grains contained in the compact are sintered together to create a dense sintered body. The sintering conditions are not limited so long as a dense magnetic body can be obtained, and may be set as 1 to 5 hours or so at a temperature of 900 to 1200° C. in atmosphere, for example. If the sintering temperature is too low or the sintering period is too short, a magnetic body of the desired properties may not be obtained due to insufficient densification. If the sintering temperature is too high or the sintering period is too long, on the other hand, the composition may shift due to volatilization of the components or the properties may drop due to production of coarse grains. It should be noted that sintering may be performed in an atmosphere where the partial oxygen pressure is higher than in the air.

The method for manufacturing a magnetic body made of the aforementioned ferrite material pertaining to another aspect of the present invention (hereinafter also referred to simply as "second aspect") differs from the aforementioned first aspect only in the following two points. The first point is that the Mn content in the iron oxide powder used as a raw material powder is 0.20 percent by mass or higher and its upper limit is not specified. The second point is that a mol ratio of Ni to Zn (Ni/Zn) in the ferrite material is determined based on the Mn content in the iron oxide powder and the raw material powders are compounded in such a way that the mol ratio is achieved. These two points are explained in detail below.

The iron oxide powder used as a raw material in the second aspect contains Mn by 0.20 percent by mass in terms of the metal element or more. By setting the content of Mn in iron oxide to 0.20 percent by mass or higher, a coil component constituted by the obtained magnetic body can have excellent direct-current superimposition property just like in the first aspect. From the viewpoint of obtaining a coil component having superior direct-current superimposition property, preferably the Mn content in the iron oxide powder is set to 0.30 percent by mass or higher. In the second aspect, the upper limit of Mn content in the iron oxide powder is not specified in any way. This is because any drop in magnetic permeability accompanying an increase in the Mn content can be compensated for by adjusting the mol ratio of Ni to Zn (Ni/Zn) described below. From the viewpoint of obtaining a magnetic body having excellent magnetic permeability, however, the Mn content is set preferably to 0.85 percent by mass or lower, or more preferably to 0.80 percent by mass or lower. Also, by setting the content of Mn in the iron oxide powder to 0.80 percent by mass or lower, a coil component having superior direct-current superimposition property can be obtained.

In the second aspect, a mol ratio of Ni to Zn (Ni/Zn) in the Ni—Zn ferrite material is determined based on the Mn content in the iron oxide powder used as a raw material, and the raw material powders are compounded in such a way that the mol ratio is achieved. To be specific, the mol ratio (Ni/Zn) is reduced as the Mn content in the iron oxide powder increases. This is based on the new fact learned by the inventor of the present invention that, while the finally obtained coil component can have extremely excellent direct-current superimposition property when the Mn content in the iron oxide powder used as a raw material is high, its magnetic permeability drops, albeit slightly. With any Ni—Zn ferrite material, lowering its Ni/Zn mol ratio allows for increase in magnetic permeability, although doing so results in slightly lower direct-current superimposition property; accordingly, this technique can be used to compensate for the aforementioned slight drop in magnetic permeability. To actually determine a Ni/Zn mol ratio for the Ni—Zn ferrite material, simply prepare a prototype magnetic body constituted by a Ni—Zn ferrite material having a specific composition, measure its properties, change the composition based on the measured results, and repeat this process. Also, a Ni/Zn mol ratio may be determined by performing simulation based on a database of compositions and properties that have been measured/collected beforehand.

As mentioned above, reducing the Ni/Zn mol ratio leads to a decrease in the use quantity of the Ni-containing ingredient among the raw material powders from which to manufacture the Ni—Zn ferrite material. The Ni-containing raw material, such as NiO, is the costliest of the raw material powders used in the manufacturing of the Ni—Zn ferrite material. Accordingly, the manufacturing cost of the Ni—Zn ferrite material, and that of the magnetic body made therefrom, can also be lowered by reducing the Ni/Zn mol ratio.

The magnetic body obtained by the manufacturing method pertaining to the first aspect or second aspect becomes a coil component once a conductor is wound around it. This coil component has greater specific magnetic permeability and superior direct-current superimposition property compared to any coil component formed by a magnetic body of the same composition that uses, as a raw material, an iron oxide powder whose Mn content is outside the desired range.

EXAMPLES

The present invention is explained more specifically below using examples; it should be noted, however, that the present invention is not limited to these examples.

Example 1-1

Preparation of Magnetic Body and Coil Component

First, as raw material powders, $Fe_2O_3$ containing Mn by 0.20 percent by mass, ZnO, CuO, and NiO, were prepared. Next, these raw material powders were scaled to weights corresponding to 66.2 percent by mass (49 percent by mol) for $Fe_2O_3$, 15.8 percent by mass (23 percent by mol) for ZnO, 4.7 percent by mass (7 percent by mol) for CuO, and 13.3 percent by mass (21 percent by mol) for NiO, and then mixed in a wet mill. Next, the dispersion medium was evaporated and removed, and the obtained mixed powder was heat-treated for 2 hours at 800° C. in the atmosphere to obtain a calcined powder. Next, the obtained calcined powder was pulverized until its BET specific surface area fell in a range of 2.0 to 3.0 $m^2/g$. Next, distilled water and PVA (polyvinyl alcohol) were added to the pulverized calcined powder as a dispersion medium and a binder, respectively, after which the mixture was spray-dried using a spray dryer to obtain a granulated powder. Next, the obtained granulated powder was fed into dies and uniaxially compressed under a pressure of 10 MPa to obtain a compact having a toroidal shape. Next, the obtained compact was sintered for 1 hour at 1100° C. in the atmosphere to obtain a magnetic body of 25 mm in outer diameter, 12 mm in inner diameter, and 15 mm in thickness. Lastly, a conductive wire was wound around the obtained magnetic body by 20 turns to obtain a coil component pertaining to Example 1-1.

Measurement of Magnetic Permeability

The obtained coil component was measured for specific magnetic permeability using an impedance analyzer (E4990A, manufactured by Keysight Technologies, Inc.) as a measuring device, at room temperature under the conditions of 500 mV in OSC level and 1 MHz in frequency. The obtained specific magnetic permeability was 450.

Measurement of Direct-Current Superimposition Property and Temperature Dependence of Inductance The aforementioned coil component was measured for inductance using a LCR meter (E4980A, manufactured by Keysight Technologies, Inc.) at room temperature under the conditions of 20 mA in OSC level and 100 kHz in frequency, by gradually increasing the current from 0 A. Then, when the inductance dropped by 30% from where the current was 0 A, the corresponding current value was taken as representing the direct-current superimposition property. It can be said that, the greater this current value, the more superior the direct-current superimposition property of the coil component becomes. The obtained direct-current superimposition property was 515 mA.

Also, using the same device, the coil component was measured for inductance by raising its temperature from room temperature (25° C.) to 150° C. while keeping the current at 0 A. Then, the rate of change in inductance from room temperature to 150° C. (($L_{150° C.}-L_{25° C.}$)/$L_{25° C.}$×100%) was taken as the temperature dependence of inductance. Here, $L_{25° C.}$ represents the measured value of inductance at room temperature (25° C.), while $L_{150° C.}$ represents the measured value of inductance at 150° C. The obtained temperature dependence of inductance was 65%.

The above results, together with the results of other examples and comparative examples as described below, are shown in Table 1 and FIGS. 1 to 3, respectively.

Examples 1-2 to 1-9

Coil components pertaining to Examples 1-2 to 1-9 were each prepared according to the same procedure in Example 1-1, except that the $Fe_2O_3$ powder used as a raw material was changed to one with a Mn content of 0.25 percent by mass (Example 1-2), 0.30 percent by mass (Example 1-3), 0.40 percent by mass (Example 1-4), 0.50 percent by mass (Example 1-5), 0.60 percent by mass (Example 1-6), 0.70 percent by mass (Example 1-7), 0.80 percent by mass (Example 1-8), and 0.85 percent by mass (Example 1-9), respectively.

The obtained coil components were measured for magnetic permeability, direct-current superimposition property, and temperature dependence of inductance, according to the same methods in Example 1-1. The results are summarized and shown respectively in Table 1 and FIGS. 1 to 3 presented below.

Comparative Examples 1-1 and 1-2

Coil components pertaining to Comparative Examples 1-1 and 1-2 were each prepared according to the same procedure in Example 1, except that the $Fe_2O_3$ powder used as a raw material was changed to one with a Mn content of 0.15 percent by mass (Comparative Example 1-1) and 0.90 percent by mass (Comparative Example 1-2), respectively.

Generally, for $Fe_2O_3$ raw material powders used in the synthesis of Ni—Zn ferrite materials for use in electronic component applications, those having the lowest possible Mn content are used. This is because Mn is considered a harmful component that produces Mn—Zn ferrite to cause the insulation resistivity to drop locally. Improving the purity to a level corresponding to a Mn content below 0.001 percent by mass, which means that Mn is virtually not contained, is theoretically possible for these $Fe_2O_3$ raw material powders; in actual manufacturing, however, those with a Mn content of around 0.15 percent by mass are used in consideration of cost, etc. Accordingly, in Comparative Example 1-1 explained here, and in Comparative Examples 1-3 to 1-8 described below, a $Fe_2O_3$ raw material powder with this Mn content of 0.15 percent by mass was used. Also, in Comparative Example 1-2 explained here, a Fe raw material powder with a Mn content of 0.90 percent by mass was used to confirm the upper-limit value of allowable Mn content. The obtained coil components were measured for magnetic permeability, direct-current superimposition property, and temperature dependence of inductance, according to the same methods in Example 1-1. The results are summarized and shown respectively in Table 1 and FIGS. 1 to 3 presented below.

Comparative Examples 1-3 to 1-8

Coil components pertaining to Comparative Examples 1-3 to 1-8 were each prepared according to the same procedure in Comparative Example 1-1, except that a $Mn_3O_4$ powder was used further, as an additive material in the raw material powders, and the total quantity of Mn contained in the mixed powder or Ni—Zn ferrite material would match that in Example 1-1, 1-3, 1-4, 1-5, 1-6, and 1-8, respectively. Specifically, in the total quantity of Mn in the Ni—Zn ferrite material, Comparative Example 1-3 matches Example 1-1, Comparative Example 1-4 matches Example 1-3, Comparative Example 1-5 matches Example 1-4, Comparative Example 1-6 matches Example 1-5, Comparative Example 1-7 matches Example 1-6, and Comparative Example 1-8 matches Example 1-8.

The obtained coil components were measured for magnetic permeability, direct-current superimposition property, and temperature dependence of inductance, according to the same methods in Example 1-1. The results are summarized and shown respectively in Table 1 and FIGS. 1 to 3 presented below.

TABLE 1

|  | Mn content in $Fe_2O_3$ [% by mass] | $Mn_3O_4$ added? | Specific magnetic permeability μ at 1 MHz | Direct-current superimposition property [mA] | Temperature dependence of inductance [%] | Remarks |
|---|---|---|---|---|---|---|
| Example 1-1 | 0.20 | No | 450 | 515 | 65 |  |
| Example 1-2 | 0.25 | No | 450 | 526 | 67 |  |
| Example 1-3 | 0.30 | No | 449 | 537 | 72 |  |
| Example 1-4 | 0.40 | No | 447 | 542 | 73 |  |
| Example 1-5 | 0.50 | No | 447 | 543 | 76 |  |
| Example 1-6 | 0.60 | No | 445 | 544 | 85 |  |
| Example 1-7 | 0.70 | No | 443 | 546 | 92 |  |
| Example 1-8 | 0.80 | No | 436 | 538 | 97 |  |
| Example 1-9 | 0.85 | No | 420 | 522 | 95 |  |
| Comparative Example 1-1 | 0.15 | No | 451 | 500 | 64 |  |
| Comparative Example 1-2 | 0.90 | No | 387 | 508 | 94 |  |
| Comparative | 0.15 | Yes | 433 | 500 | 95 | Total quantity of |

TABLE 1-continued

| | Mn content in Fe$_2$O$_3$ [% by mass] | Mn$_3$O$_4$ added? | Specific magnetic permeability μ at 1 MHz | Direct-current superimposition property [mA] | Temperature dependence of inductance [%] | Remarks |
|---|---|---|---|---|---|---|
| Example 1-3 | | | | | | Mn same as in Example 1-1 |
| Comparative Example 1-4 | 0.15 | Yes | 427 | 504 | 118 | Total quantity of Mn same as in Example 1-3 |
| Comparative Example 1-5 | 0.15 | Yes | 422 | 510 | 132 | Total quantity of Mn same as in Example 1-4 |
| Comparative Example 1-6 | 0.15 | Yes | 413 | 513 | 155 | Total quantity of Mn same as in Example 1-5 |
| Comparative Example 1-7 | 0.15 | Yes | 403 | 508 | 165 | Total quantity of Mn same as in Example 1-6 |
| Comparative Example 1-8 | 0.15 | Yes | 387 | 492 | 183 | Total quantity of Mn same as in Example 1-8 |

Figure 1:
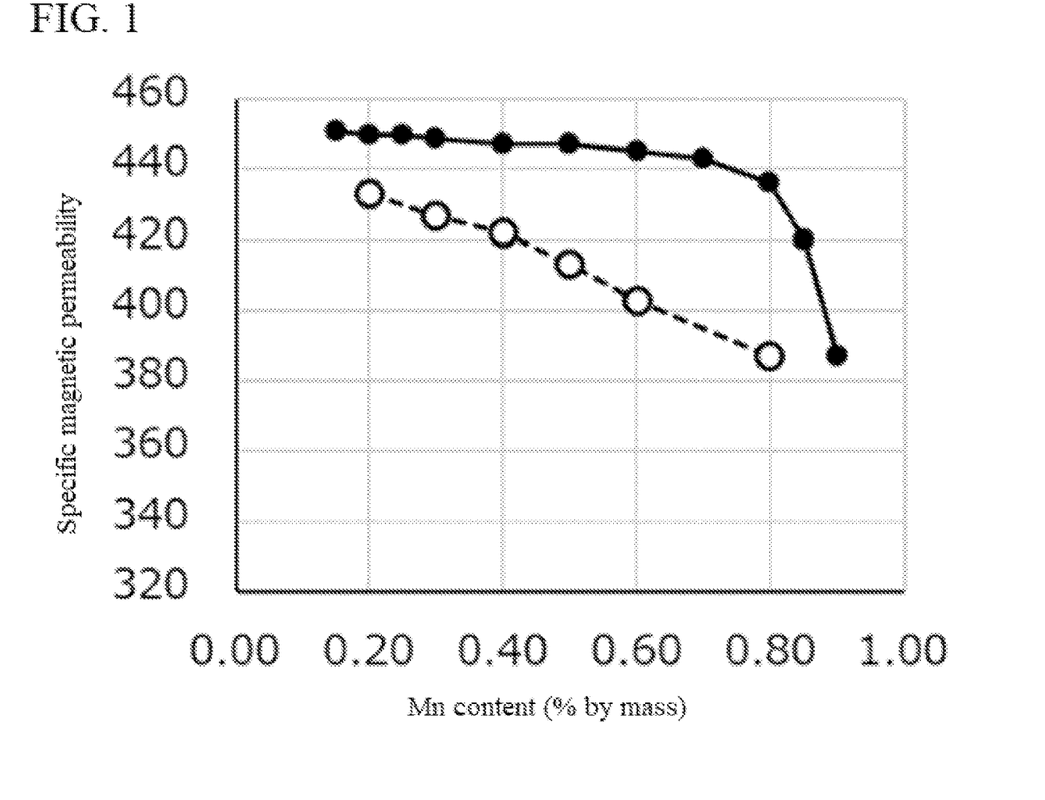
FIG. 1 is a graph showing the Mn content vs. specific magnetic permeability relationships in the coil components pertaining to examples and comparative examples regarding the first aspect of the present invention (black dots: Mn not added separately; white dots: Mn added separately).

It is clear from Table 1 and FIG. 1 that the coil components pertaining to Examples which were manufactured without separately adding Mn other than using, as a raw material, a Fe$_2$O$_3$ powder containing the desired quantity of Mn, exhibited higher magnetic permeability at the same Mn quantity than that of the coil components pertaining to Comparative Examples which were manufactured by using, as a raw material, a Fe$_2$O$_3$ powder with lower Mn content used in the synthesis of general Ni—Zn ferrite materials in industrial settings and by further adding Mn separately. It is also clear that, while the magnetic permeability decreased rapidly with an increase in Mn content in the coil components pertaining to Comparative Examples, such decrease in magnetic permeability was inhibited in the coil components pertaining to Examples. In particular, decrease in magnetic permeability was inhibited notably when the Mn content was 0.80 percent by mass or lower.

Figure 2:
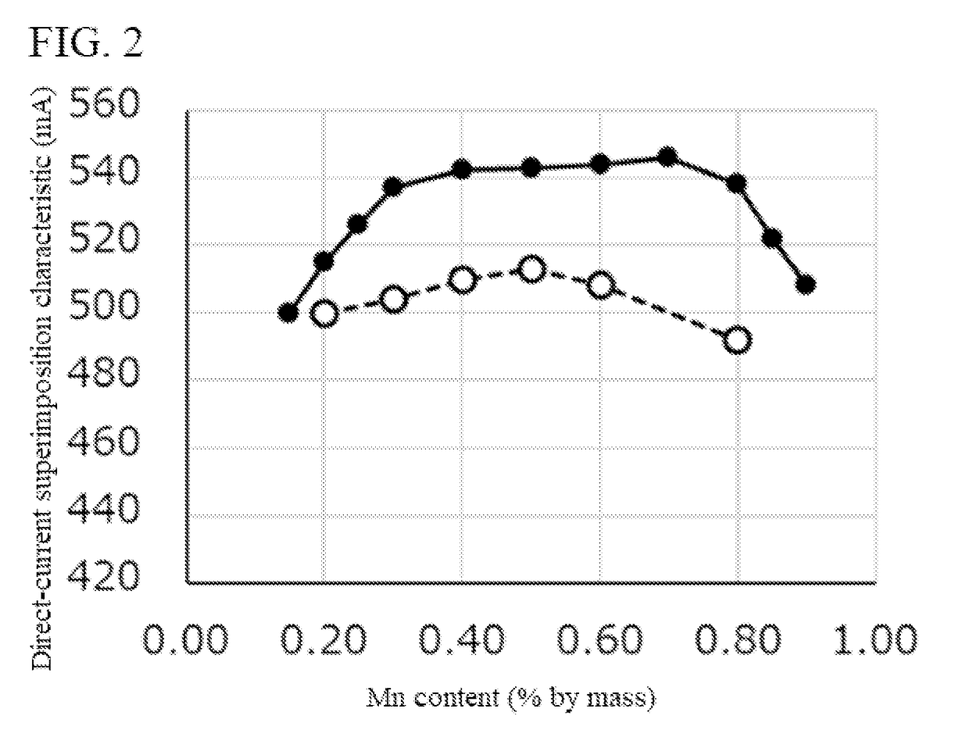
FIG. 2 is a graph showing the Mn content vs. direct-current superimposition property relationships in the coil components pertaining to examples and comparative examples regarding the first aspect of the present invention (black dots: Mn not added separately; white dots: Mn added separately).

It is clear from Table 1 and FIG. 2 that the coil components pertaining to Examples which were manufactured without separately adding Mn other than using, as a raw material, a Fe$_2$O$_3$ powder containing the desired quantity of Mn, exhibited superior direct-current superimposition property at the same Mn quantity to the coil components pertaining to Comparative Examples which were manufactured by using, as a raw materials, a Fe$_2$O$_3$ powder with lower Mn content used in the synthesis of general Ni—Zn ferrite materials in industrial settings and by further adding Mn separately. In particular, this difference was notable at a Mn content in a range of 0.30 to 0.80 percent by mass.

Figure 3:
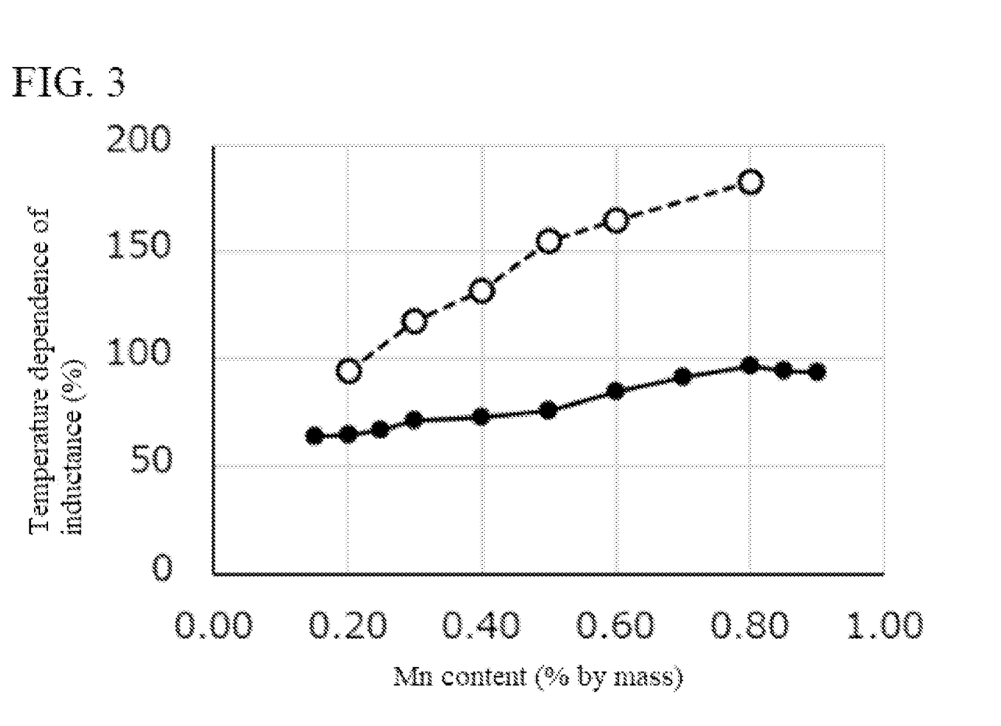
FIG. 3 is a graph showing the Mn content vs. temperature dependence of inductance relationships in the coil components pertaining to examples and comparative examples regarding the first aspect of the present invention (black dots: Mn not added separately; white dots: Mn added separately).

It is clear from Table 1 and FIG. 3 that the coil components pertaining to Examples which were manufactured without separately adding Mn other than using, as a raw material, a Fe$_2$O$_3$ powder containing the desired quantity of Mn, exhibited lower temperature dependence of inductance than did the coil components pertaining to Comparative Examples which were manufactured by using, as a raw material, a Fe$_2$O$_3$ powder with lower Mn content used in the synthesis of general Ni—Zn ferrite materials in industrial settings and by further adding Mn separately. It is also clear that, when the Mn content was changed, the coil components pertaining to Examples experienced a smaller change in temperature dependence of inductance compared to the coil components pertaining to Comparative Examples.

Reasons are not clear why the coil components pertaining to Examples which were manufactured without separately adding Mn other than using, as a raw materials, a Fe$_2$O$_3$ powder containing the desired quantity of Mn, exhibited superior properties to the coil components pertaining to Comparative Examples which were manufactured by using, as a raw material, a Fe$_2$O$_3$ powder with lower Mn content used in the synthesis of general Ni—Zn ferrite materials in industrial settings and by further adding Mn separately, as described above. When the inventor of the present invention used EDX to measure the cross-sections of samples of the two groups of coil components, including those in Examples to which Mn was not added separately and others in Comparative Examples to which Mn was added separately, in an attempt to check for difference in the state of in-plane distribution of Mn, virtually no uneven Mn distribution was observed for the samples of both of the two groups and there was no difference between the two. However, it is considered that, because fine grains containing Mn are evenly distributed in the Fe$_2$O$_3$ powder containing Mn, this is somehow contributing to the improvement in properties. Specifically, when the trace component Mn is added separately to a raw material powder, it is difficult to evenly distribute Mn in the raw material powder because the quantity of Mn is smaller than other components. This produces, in the obtained magnetic body, microscopic compositional deviations which are difficult to detect, even by EDS, and which prevent the properties from manifesting fully. By contrast, using a Fe$_2$O$_3$ powder in which Mn is evenly distributed reduces the aforementioned compositional deviations, and this is presumably why excellent properties are demonstrated.

Example 2-1

A coil component pertaining to Example 2-1 was prepared according to the same procedure in Example 1-3. It should be noted that, in this example, Ni and Zn account for 44 percent by mol in total in the raw material powders, where the Ni/Zn mol ratio is 0.913.

The obtained coil component was measured for magnetic permeability, direct-current superimposition property, and temperature dependence of inductance, according to the same methods in Example 1-1. As a result, the specific magnetic permeability was 451, direct-current superimposition property was 536 mA, and temperature dependence of inductance was 72%. These results are summarized and shown in Table 2 presented below. It should be noted that, while the obtained values of specific magnetic permeability and direct-current superimposition property are slightly different from the results of Example 1-3, these differences all reflect errors arising from slight differences in the manufacturing conditions of coil components, as well as measurement errors, and are therefore statistically insignificant.

Examples 2-2 and 2-3

Coil components pertaining to Examples 2-2 and 2-3 were each prepared according to the same procedure in Example 2-1, except that the $Fe_2O_3$ powder used as a raw material was changed to one with a Mn content of 0.60 percent by mass (Example 2-2) and 0.80 percent by mass (Example 2-3), respectively, and that the compounding ratios of the raw material powders were changed so as to achieve a Ni/Zn mol ratio of 0.90 (Example 2-2) and 0.89 (Example 2-3), respectively, with Ni and Zn still accounting for 44 percent by mol in total in the Ni—Zn ferrite material as in Example 2-1. Actual compounding was performed based on 15.9 percent by mass of ZnO and 13.2 percent by mass of NiO in Example 2-2, and based on 16.0 percent by mass of ZnO and 13.1 percent by mass of NiO in Example 2-3.

The obtained coil components were measured for magnetic permeability, direct-current superimposition property, and temperature dependence of inductance, according to the same methods in Example 1-1. As a result, the specific magnetic permeability was 451, direct-current superimposition property was 535 mA, and temperature dependence of inductance was 85%, for the coil component pertaining to Example 2-2. For the coil component pertaining to Example 2-3, the specific magnetic permeability was 452, direct-current superimposition property was 517 mA, and temperature dependence of inductance was 75%. These results are summarized and shown in Table 2 presented below.

Comparative Examples 2-1 to 2-3

Coil components pertaining to Comparative Examples 2-1 to 2-3 were each prepared according to the same procedure in Example 2-1, except that the $Fe_2O_3$ powder used as a raw material was changed to one with a Mn content of 0.15 percent by mass, and that the compounding ratios of the raw material powders were changed so as to achieve a Ni/Zn mol ratio of 0.92 (Comparative Example 2-1), 0.90 (Comparative Example 2-2), and 0.89 (Comparative Example 2-3), respectively, with Ni and Zn still accounting for 44 percent by mol in total in the Ni—Zn ferrite material as in Example 2-1. Actual compounding was performed based on 15.8 percent by mass of ZnO and 13.3 percent by mass of NiO in Comparative Example 2-1, based on 15.9 percent by mass of ZnO and 13.2 percent by mass of NiO in Comparative Example 2-2, and based on 16.0 percent by mass of ZnO and 13.1 percent by mass of NiO in Comparative Example 2-3.

It should be noted that the reason for using a $Fe_2O_3$ raw material powder with a Mn content of 0.15 percent by mass in Comparative Examples 2-1 to 2-3 explained herein, and in Comparative Examples 2-4 to 2-6 described later, is the same as that described in Comparative Examples 1-1 and 1-2 above. The obtained coil components were measured for magnetic permeability, direct-current superimposition property, and temperature dependence of inductance, according to the same methods in Example 1-1. As a result, the coil component pertaining to Comparative Example 2-1 achieved 451 for specific magnetic permeability and 64% for rate of change in inductance due to temperature, values similar to those in the aforementioned Examples; however, its direct-current superimposition property was 500 mA, a drop from the levels in the aforementioned Examples. Similar trends were found in Comparative Examples 2-2 and 2-3: in Comparative Example 2-2, the specific magnetic permeability was 457, rate of change in inductance due to temperature was 69%, and direct-current superimposition property was 492; in Comparative Example 2-3, the specific magnetic permeability was 465, rate of change in inductance due to temperature was 72%, and direct-current superimposition property was 484. These results are summarized and shown in Table 2 presented below.

In Comparative Examples 2-4 to 2-6 explained below, it was confirmed that, when manganese oxide ($Mn_3O_4$) is used as an additive, excellent direct-current superimposition property and high magnetic permeability cannot be achieved simultaneously by adjusting the Ni/Zn mol ratio, even if the Mn content in the Ni—Zn ferrite material is the same as that in the aforementioned Examples.

Comparative Example 2-4

A coil component pertaining to Comparative Example 2-4 was prepared according to the same procedure in Example 2-1, except for the following points: the $Fe_2O_3$ powder used as a raw material was changed to one with a Mn content of 0.15 percent by mass; also, a $Mn_3O_4$ powder was further employed as an additive in the raw material powders to match the total quantity of Mn contained in the mixed powder or Ni—Zn ferrite material, to the aforementioned quantity of the $Fe_2O_3$ powder before the change (Example 2-1); furthermore, the Ni/Zn mol ratio was adjusted to 0.86, with Ni and Zn still accounting for 44 percent by mol in total in the Ni—Zn ferrite material as in Example 2-1, so as to bring the specific magnetic permeability of the coil component to a level similar to that of the coil component pertaining to Example 2-1. Actual compounding was performed based on 16.3 percent by mass of ZnO and 12.9 percent by mass of NiO.

When the obtained coil component was measured for magnetic permeability, direct-current superimposition property, and temperature dependence of inductance according to the same methods in Example 1-1, the specific magnetic permeability was 452, but the direct-current superimposition property and temperature dependence of inductance worsened to 450 mA and 121%, respectively.

Comparative Example 2-5

A coil component pertaining to Comparative Example 2-5 was prepared according to the same procedure in Example 2-2, except for the following points: the $Fe_2O_3$ powder used as a raw material was changed to one with a Mn content of 0.15 percent by mass; also, a $Mn_3O_4$ powder was further employed as an additive in the raw material powders to match the total quantity of Mn contained in the mixed powder or Ni—Zn ferrite material, to the aforementioned quantity of the $Fe_2O_3$ powder before change (Example 2-2); furthermore, the Ni/Zn mol ratio was adjusted to 0.82, with Ni and Zn still accounting for 44 percent by mol in total in the Ni—Zn ferrite material as in Example 2-1, so as to bring the specific magnetic permeability of the coil component to a level similar to that of the coil component pertaining to Example 2-2. Actual compounding was performed based on 16.6 percent by mass of ZnO and 12.5 percent by mass of NiO.

When the obtained coil component was measured for magnetic permeability, direct-current superimposition property, and temperature dependence of inductance according to the same methods in Example 1-1, the specific magnetic permeability was 450, but the direct-current superimposition property and temperature dependence of inductance worsened to 430 mA and 174%, respectively.

Comparative Example 2-6

A coil component pertaining to Comparative Example 2-6 was prepared according to the same procedure in Example 2-3, except for the following points: the $Fe_2O_3$ powder used as a raw material was changed to one with a Mn content of 0.15 percent by mass; also, a $Mn_3O_4$ powder was further employed as an additive in the raw material powders to match the total quantity of Mn contained in the mixed powder or Ni—Zn ferrite material, to the aforementioned quantity of the $Fe_2O_3$ powder before the change (Example 2-3); furthermore, the Ni/Zn mol ratio was lowered to 0.80, with Ni and Zn still accounting for 44 percent by mol in total in the Ni—Zn ferrite material as in Example 2-1, so as to bring the specific magnetic permeability of the coil component to a level similar to that of the coil component pertaining to Example 2-3. Actual compounding was performed based on 16.8 percent by mass of ZnO and 12.3 percent by mass of NiO.

When the obtained coil component was measured for magnetic permeability, direct-current superimposition property, and temperature dependence of inductance according to the same methods in Example 1-1, the specific magnetic permeability was only 435. At the same time, the direct-current superimposition property and temperature dependence of inductance worsened to 401 mA and 188%, respectively.

The results of Comparative Examples 2-4 to 2-6 are shown in Table 2 together with those of the aforementioned Examples and Comparative Examples.

pertaining to Examples 2-1 to 2-3 that use, as a raw material, a $Fe_2O_3$ powder containing the desired quantity of Mn, can achieve excellent direct-current superimposition property and specific magnetic permeability simultaneously by adjusting the Ni/Zn mol ratio in the Ni—Zn ferrite material, unlike the coil components pertaining to Comparative Examples 2-1 to 2-3 that use, as a raw material, a $Fe_2O_3$ powder with lower Mn content used in the synthesis of general Ni—Zn ferrite materials in industrial settings. From the results of Comparative Examples 2-1 to 2-3, when a $Fe_2O_3$ powder with lower Mn content is used as a raw material, clearly a coil component offering excellent direct-current superimposition property while still retaining specific magnetic permeability cannot be manufactured solely by adjusting the Ni/Zn mol ratio in the Ni—Zn ferrite material. Also, when the Ni/Zn mol ratio is adjusted according to Examples 2-1 to 2-3, the use quantity of NiO, which is an expensive raw material, can be reduced and therefore the raw material cost can be kept low.

Also, when Example 2-1 is compared with Comparative Example 2-4, Example 2-2 is compared with Comparative Example 2-5, and Example 2-3 is compared with Comparative Example 2-6, clearly the coil components pertaining to the Examples in which no Mn is added separately other than that a $Fe_2O_3$ powder containing the desired quantity of Mn is used as a raw material, can achieve excellent direct-current superimposition property and specific magnetic permeability simultaneously by adjusting the Ni/Zn mol ratio in the Ni—Zn ferrite material, unlike the coil components pertaining to the Comparative Examples in which a $Fe_2O_3$ powder with lower Mn content used in the synthesis of general Ni—Zn ferrite materials in industrial settings is used as a raw material and in which Mn is further added separately. Also, when a $Fe_2O_3$ powder with lower Mn content is used as a raw material, clearly a coil component offering excellent direct-current superimposition property and low temperature dependence of inductance, while still retaining specific magnetic permeability, cannot be manufactured solely by adjusting the Ni/Zn mol ratio, even if Mn is added separately to increase the total quantity of Mn in the Ni—Zn ferrite material.

TABLE 2

|  | Mn content in $Fe_2O_3$ [% by mass] | $Mn_3O_4$ added? | Ni/Zn mol ratio | Specific magnetic permeability μ at 1 MHz | Direct-current superimposition property [mA] | Temperature dependence of inductance [%] | Remarks |
| --- | --- | --- | --- | --- | --- | --- | --- |
| Example 2-1 | 0.30 | No | 0.913 | 451 | 536 | 72 |  |
| Example 2-2 | 0.60 | No | 0.90 | 451 | 535 | 85 |  |
| Example 2-3 | 0.80 | No | 0.89 | 452 | 517 | 75 |  |
| Comparative Example 2-1 | 0.15 | No | 0.92 | 451 | 500 | 64 |  |
| Comparative Example 2-2 | 0.15 | No | 0.90 | 457 | 492 | 69 |  |
| Comparative Example 2-3 | 0.15 | No | 0.89 | 465 | 484 | 72 |  |
| Comparative Example 2-4 | 0.15 | Yes | 0.86 | 452 | 450 | 121 | Total quantity of Mn same as in Example 2-1 |
| Comparative Example 2-5 | 0.15 | Yes | 0.82 | 450 | 430 | 174 | Total quantity of Mn same as in Example 2-2 |
| Comparative Example 2-6 | 0.15 | Yes | 0.80 | 435 | 401 | 188 | Total quantity of Mn same as in Example 2-3 |

When Examples 2-1 to 2-3 are compared with Comparative Examples 2-1 to 2-3, clearly the coil components Furthermore, when Examples 2-1 to 2-3 are compared with one another, clearly the Ni/Zn mol ratio that achieves the desired specific magnetic permeability decreases as the Mn content in the $Fe_2O_3$ powder used as a raw material increases.

As described above, the reason is unclear as to why the coil components pertaining to the Examples in which no Mn is added separately other than that a $Fe_2O_3$ powder containing the desired quantity of Mn is used as a raw material, can achieve excellent direct-current superimposition property unlike the coil components pertaining to the Comparative Examples in which a $Fe_2O_3$ powder with lower Mn content used in the synthesis of general Ni—Zn ferrite materials in industrial settings is used as a raw material and in which Mn is further added separately. However, as considered in the aforementioned Examples and Comparative Examples pertaining to the first aspect, it is presumed that, also in the Examples pertaining to the second aspect, an even distribution of fine grains containing Mn in the $Fe_2O_3$ powder containing Mn is somehow contributing to the improvement in properties.

According to the present invention, a coil component having excellent direct-current superimposition property and magnetic permeability can be provided without using any additives other than the primary components. Also, according to a preferred aspect of the present invention, the direct-current superimposition property and magnetic permeability can be adjusted with ease. As a result, a high-performance coil component can be manufactured through simple operations and its manufacturing cost, or manufacturing cost as well as development cost, can be reduced, and in these respects, the present invention is considered useful. Additionally, the present invention is also considered useful in that it can reduce microscopic compositional deviations in the magnetic body and thereby inhibit the properties of the coil component to be manufactured from varying. Furthermore, the present invention is also useful in that, according to a preferred aspect thereof, the use quantity of an expensive Ni-containing raw material can be reduced in the raw material powder used for manufacturing the Ni—Zn ferrite material, and consequently the manufacturing cost can be reduced.

What is claimed:

1. A method for manufacturing a magnetic body which is made of a ferrite material containing Fe, Ni, and Zn, whose Fe content is 64.4 to 67.4 percent by mass in terms of $Fe_2O_3$, and whose Mn content is 0.1288 to 0.5729 percent by mass in terms of metal Mn, said method comprising:

preparing a calcinated powdery material for obtaining the ferrite material, using an iron oxide powder whose Mn content is 0.20 to 0.85 percent by mass, zinc oxide powder, and nickel oxide powder, as raw material powder wherein a mol ratio of Ni to Zn (Ni/Zn) in the ferrite material is determined based on the Mn content of the iron oxide powder;

obtaining a compact by compressing the calcinated powdery material; and sintering the compact to obtain the magnetic body.

2. The method according to claim 1, wherein the ferrite material contains Fe, Zn, and Ni at following ratios in terms of $Fe_2O_3$, ZnO, and NiO:
64.4 to 67.4 percent by mass of $Fe_2O_3$;
10.4 to 25.6 percent by mass of ZnO; and
9.4 to 23.8 percent by mass of NiO.

3. The method according to claim 1, wherein the zinc oxide powder and the nickel oxide powder each contain several hundreds of ppm or less of unavoidable impurities.

4. A method for manufacturing a magnetic body which is made of a ferrite material containing Fe, Ni, Zn, and Cu, whose Fe content is 58.9 to 66.9 percent by mass in terms of $Fe_2O_3$, and whose Mn content is 0.1178 to 0.5686 percent by mass in terms of metal Mn, said method comprising:

preparing a calcinated powdery material for obtaining the ferrite material, using an iron oxide powder whose Mn content is 0.20 to 0.85 percent by mass, zinc oxide powder, nickel oxide powder, and copper oxide powder, as raw material powder wherein a mol ratio of Ni to Zn (Ni/Zn) in the ferrite material is determined based on the Mn content of the iron oxide powder;

obtaining a compact by compressing the calcinated powdery material; and sintering the compact to obtain the magnetic body.

5. The method according to claim 4, wherein the ferrite material contains Fe, Zn, Ni, and Cu at following ratios in terms of $Fe_2O_3$, ZnO, NiO, and CuO:
58.9 to 66.9 percent by mass of $Fe_2O_3$;
9.5 to 25.4 percent by mass of ZnO;
8.6 to 23.6 percent by mass of NiO; and
0.6 to 8.6 percent by mass of CuO.

6. The method according to claim 5, wherein the zinc oxide powder, the nickel oxide powder, and the copper oxide powder each contain several hundreds of ppm or less of unavoidable impurities.

7. A coil component comprising a combination of a magnetic body obtained per the method according to claim 1, and a conductor.

8. A coil component comprising a combination of a magnetic body obtained per the method according to claim 5, and a conductor.

* * * * *